United States Patent [19]
Huber et al.

[11] 3,767,546
[45] Oct. 23, 1973

[54] PRODUCTION OF 16-DEHYDROPREGNENOLONE AND RELATED COMPOUNDS

[75] Inventors: Joel E. Huber; John M. Beaton, both of Kalamazoo, Mich.

[73] Assignee: The Upjohn Company, Kalamazoo, Mich.

[22] Filed: Nov. 4, 1971

[21] Appl. No.: 195,821

[52] U.S. Cl............................................ 204/158 R
[51] Int. Cl...................... C07b 29/06, C07c 173/00
[58] Field of Search ................................ 204/158 R

[56] References Cited
UNITED STATES PATENTS
3,541,082   11/1970   Huber............................ 204/158 R

OTHER PUBLICATIONS

Wall et al., J. Amer. Chem. Soc. 77, 5665–5668, 11/55.

*Primary Examiner*—F. C. Edmundson
*Attorney*—John Kekich et al.

[57] ABSTRACT

16-Dehydropregnenolone or 16-dehydroprogesterone is produced by cleavage of the $\Delta^{20(22)}$ double bond in pseudodiosgenin diacetate or pseudodiosgenone acetate by means of photo-oxidation with singlet oxygen in the presence of hematoporphyrin dye.

2 Claims, No Drawings

PRODUCTION OF 16-DEHYDROPREGNENOLONE AND RELATED COMPOUNDS

BACKGROUND OF THE INVENTION

16-Dehydropregnenolone (16-dehydro-$\Delta^5$-pregnene-3$\beta$-ol-20-one) has the following formula:

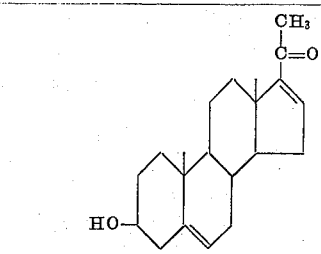

I

It is the starting material for the manufacture of a number of commercially important steroids. In the past it has been prepared by reacting the 16-cyano analog with methyl Grignard reagent.

Pseudodiosgenin diacetate has the following formula:

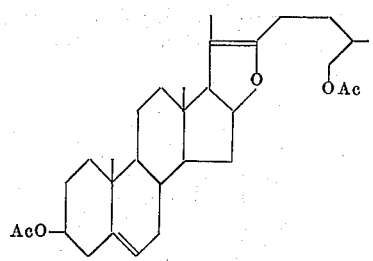

II

It is known as an intermediate for making 16-dehydropregnenolone, being a first stage intermediate from the ultimate starting material, diosgenin.

It is obtained, for example, by heating diosgenin for several hours in a sealed vessel with acetic anhydride. Mild oxygenation of pseudodiosgenin diacetate with chromium trioxide produces ring rupture, forming the following compound III:

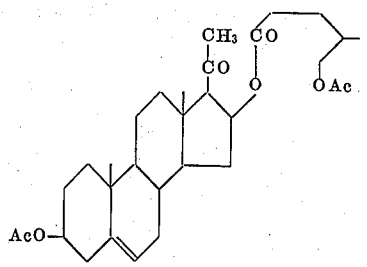

III

Heating III with acid or alkali converts it to 16-dehydropregnenolone. Other oxidizing agents have been used to produce III (Wall, et al., J.A.C.S. 77, 5665). Overall yields of greater than 55 percent based on the diosgenin starting material can be obtained by careful manipulation, but the average industrial yield is approximately 45 percent.

BRIEF DESCRIPTION OF THE INVENTION

According to the invention II is dissolved in an organic solvent in a reaction zone provided with an inlet for oxygen positioned in such a way that the oxygen entering the reaction zone is exposed to the illumination of a source of actinic light such as a fluorescent tube. The reaction is carried out in the presence of hematoporphyrin dye and in the further presence of acetic anhydride. After the oxygenation has been completed as indicated by the disappearance of starting material from the reaction zone, the product is separated from the residual solvent and reactants by known methods, and finally hydrolyzed by contacting with aqueous alkali.

In the conversion of pseudodiosgenone to 16-dehydroprogesterone the foregoing conditions can be followed.

The novel reaction of this invention has a variety of advantages. Of significance is the fact that the conditions of oxygenation are milder than those previously used in the art employing chromium trioxide, hence other molecular substituents on the molecule are considerably less subject to oxidative attack.

A further significant advantage of the reaction of chromium process of this invention is the elimination of chromifm compounds and the chromium ion as by-products of the reaction. Recovery of such heavy metal by-products or their chemical conversion to chemical states that are non-toxic to plant and animal life is dictated by considerations of technology and ecology.

DESCRIPTION OF THE PREFERRED EMBODIMENTS

Example 1 Photo-oxygenation of pseudodiosgenin diacetate

A solution of 10.00 g. of pseudodiosgenin diacetate and 25 mg. of hematoporphyrin dye in 10 ml. of acetic anhydride, 10 ml. of pyridine and 50 ml. of dry acetone was placed in a 2.5 × 60 cm. pyrex tube fitted with a medium porosity fritted disk at the bottom and a cold finger mounted at the top which extended through the center of the tube to the fritted disk. Oxygen was passed through the disk at a rate of 0.2 cu. ft./hr. while the tube was being illuminated with four 15-watt fluorescent tubes. The temperature was maintained at 15°–20° throughout the 2 hr. reaction.

The disappearance of starting material by thin layer chromatography (silica gel, 30 percent ethyl acetate in "Skelly-solve B hexanes") was used to judge the end of the reaction. The acetone was removed in vacuo at 30° leaving a red oil which was dissolved in 300 ml. of benzene. This solution was washed with 50 ml. of water, twice with 150 ml. portions of saturated sodium carbonate, twice with 100 ml. portions of water, twice with 100 ml. portions of 3N hydrochloric acid, and twice more with 100 ml. portions of water. The organic layer was concentrated in vacuo to afford a higher boiling oil which was dissolved in 75 – 100 ml. of isopropanol and refluxed under nitrogen for one-half hour. To this solution was added 60 ml. of 7 percent aqueous potassium hydroxide.

The saponification was complete after 10 min. reflux under nitrogen. The volume of the reaction mixture was reduced to approximately 100 ml. by distillation in vacuo. The addition of 75 ml. of water provided a precipitate which was collected by filtration, dried at 105° in vacuo to afford 4.28 g. of 16-dehydropregnenolone: m.p. 204°–207°; $\lambda_{Max}$. EtOh 238 nm (8000).

Example 2 Photo oxygenation of pseudodiosgenone acetate

Pseudodiosgenone acetate can be substituted for pseudodiosgenin diacetate in the procedure and apparatus of the foregoing example. Recovery of the product, 16-dehydroprogesterone follows the same procedure as is given in Example 1.

We claim:

1. A process for the production of a member of the group consisting of 16-dehydropregnenolone and 16-dehydroprogesterone, respectively, by photo-oxidation which comprises reacting in a reaction zone an organic solvent solution of a member of the group consisting of pseudodiosgenin diacetate and pseudodiosgenone acetate, respectively, with oxygen in the presence of hematoporphyrin dye and acetic anhydride while irradiating the reaction mixture in such a way that the oxygen entering the reaction zone is exposed to illumination with actinic light, and hydrolyzing the reaction product with aqueous alkali.

2. The method of claim 1 in which 16-dehydropregnenolone is produced by means of photooxygenation of pseudodiosgenin diacetate with singlet oxygen.

* * * * *